US011880526B2

(12) United States Patent
Wiles

(10) Patent No.: US 11,880,526 B2
(45) Date of Patent: Jan. 23, 2024

(54) MAINTAINING PRESSURE INPUT PATHS

(71) Applicant: Peratech Holdco Limited, North Yorkshire (GB)

(72) Inventor: Timothy Peter Wiles, North Yorkshire (GB)

(73) Assignee: Peratech Holdco Limited, North Yorkshire (GB)

( * ) Notice: Subject to any disclaimer, the term of this patent is extended or adjusted under 35 U.S.C. 154(b) by 0 days.

(21) Appl. No.: 17/879,928

(22) Filed: Aug. 3, 2022

(65) Prior Publication Data

US 2022/0404937 A1 Dec. 22, 2022

Related U.S. Application Data

(63) Continuation of application No. PCT/GB2021/000007, filed on Feb. 3, 2021.

(30) Foreign Application Priority Data

Feb. 4, 2020 (GB) .................................... 2001547

(51) Int. Cl.
*G06F 3/041* (2006.01)
(52) U.S. Cl.
CPC .............................. *G06F 3/04144* (2019.05)
(58) Field of Classification Search
CPC .................................................. G06F 3/04144
See application file for complete search history.

(56) References Cited

U.S. PATENT DOCUMENTS

| 2009/0027353 | A1 | 1/2009 | Im | |
|---|---|---|---|---|
| 2018/0129312 | A1* | 5/2018 | Westhues | G06F 3/0442 |
| 2018/0150178 | A1* | 5/2018 | Kim | G06F 3/04166 |
| 2019/0220137 | A1 | 7/2019 | Tu | |
| 2019/0310738 | A1* | 10/2019 | Dyvik | G06F 3/0418 |

FOREIGN PATENT DOCUMENTS

| CN | 110297677 A | 10/2019 |
|---|---|---|
| WO | 2018077761 A1 | 5/2018 |

OTHER PUBLICATIONS

Corresponding International Patent Application No. PCT/GB2021/000007, International Search Report and Written Opinion dated May 3, 2021, 10 pages.

* cited by examiner

*Primary Examiner* — Towfiq Elahi
(74) *Attorney, Agent, or Firm* — Cooper Legal Group LLC

(57) ABSTRACT

A method of maintaining a pressure input path in a sensing array is described. The sensing array comprises a plurality of sensing elements, and the method involves activating a first sensing element to determine a first location data point and activating a second sensing element to determine a second location data point. The state location (x,y) and state velocity ($V_x$, $V_y$) are calculated based on the first and second location data points to create a state vector. A predicted path of further location data points is determined from the state vector to avoid drop out problems with pressure inputs.

18 Claims, 10 Drawing Sheets

MAINTAINING PRESSURE INPUT PATHS

CROSS REFERENCE TO RELATED APPLICATIONS

This application is a continuation of International Patent Application number PCT/GB2021/000007, filed on 3 Feb. 2021, which claims priority from United Kingdom Patent Application number 20 01 547.5, filed on 4 Feb. 2020. The whole contents of International Patent Application number PCT/GB2021/000007 and United Kingdom Patent Application number 20 01 547.5 are incorporated herein by reference.

BACKGROUND OF THE INVENTION

The present invention relates to a method of maintaining a pressure input path in a sensing array and an apparatus for performing a method of this type.

Force sensing touch screens are known and are becoming increasingly frequent in their use in electronic devices such as mobile telephones, tablet computers or similar in both personal and professional capacities. When utilizing a touch screen of this type to provide an input, either by means of a stylus or finger press, users typically input gestures or swipes in order to achieve required responses or outputs from the electronic device.

With known touch screens, a problem occurs when the touch screen does not receive a consistent input resulting in the system interpreting this as the end of an applied pressure or press. Consequently, the system terminates the current input. In touch screens comprising sensing arrays having a plurality of sensor elements, or sensels, if one such sensor element is not activated, this can be identified as the end of the press rather than an unintended drop out of signal. This therefore leads to the system responding inaccurately to the user's input, which can lead to input errors and frustration for a user.

There remains a need to ensure that gestures in such circumstances are accurately read and that drop-out signals are only recorded when the pressure input has been terminated.

US 2018/129312 describes an active stylus motion vector which is determined and used to estimate the location of an active stylus on a touch screen. The estimated location is then used to perform localized scanning on a portion of the touch screen to improve location accuracy.

BRIEF SUMMARY OF THE INVENTION

According to a first aspect of the present invention, there is provided a method of maintaining a pressure input path in a sensing array.

According to a second aspect of the present invention, there is provided an apparatus for maintaining a pressure input.

Further desirable features of the invention are identified in the dependent claims.

Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art. Components and processes distinguished by ordinal phrases such as "first" and "second" do not necessarily define an order or ranking of any sort.

DETAILED DESCRIPTION OF EMBODIMENTS OF THE INVENTION

FIG. 1

Figure 1:
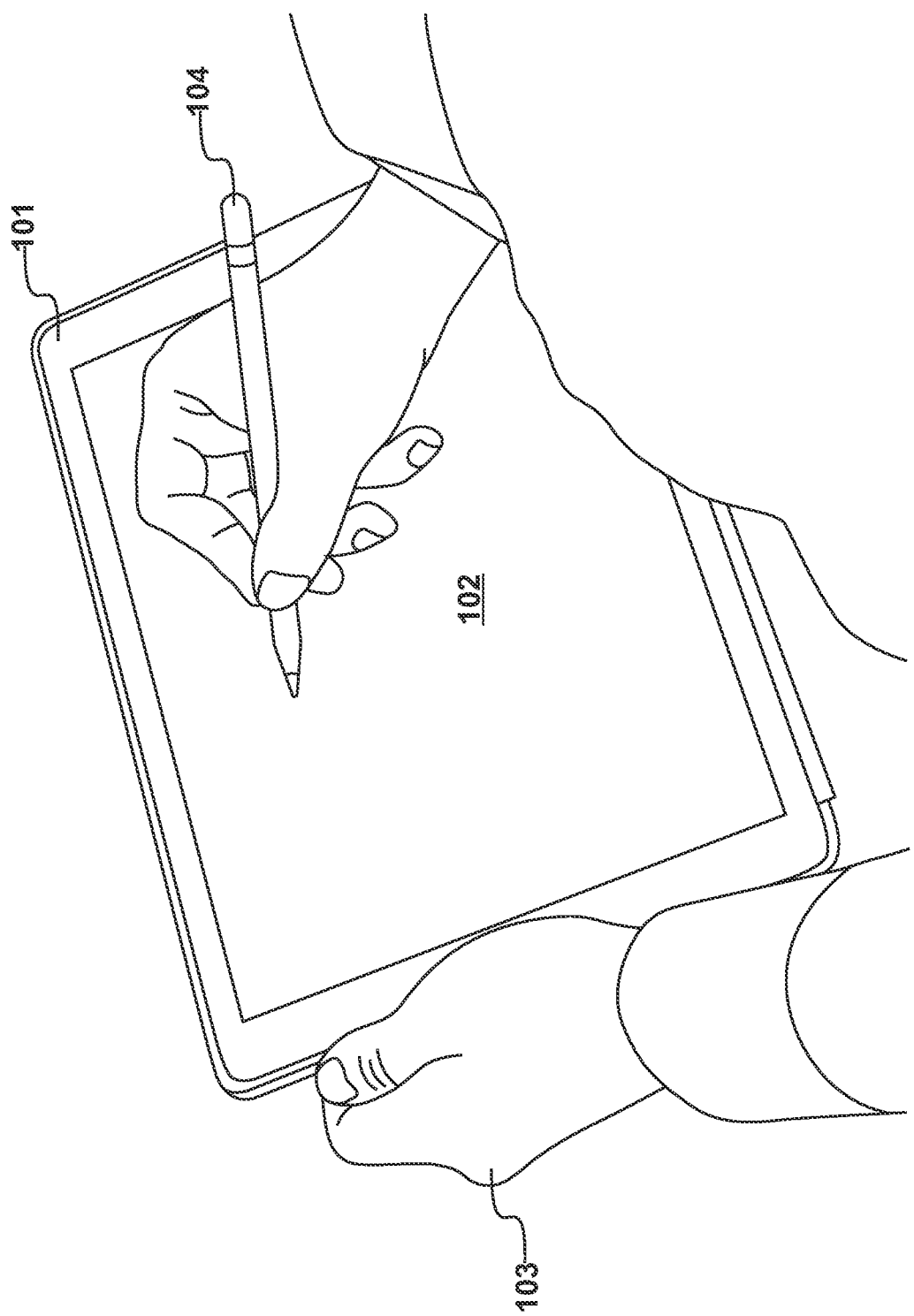
FIG. 1 shows an electronic device comprising an apparatus for tracking a pressure input.

An apparatus for tracking a pressure input and method of maintaining a pressure input path can be utilized by means of an electronic device, such as electronic device 101 which is illustrated in the form of a tablet computer. Electronic device 101 comprises a touch screen 102 which is responsive to an applied force or an applied pressure. Thus, user 103, by use of an input device, in the form of stylus 104, provides a pressure input onto touch screen 102 enabling an appropriate output onto touch screen 102 can be provided.

Often, the pressure input from stylus 104 is in the form of a gesture or swipe and may include inputs such as a pattern taking the form of a handwritten word, constructed from a continuous gesture of stylus 104 by user 103. This is one example of a pressure input path, although it is appreciated that alternative forms of pressure input path are within the scope of the present invention, and include simple swipes, gestures and/or shapes or other suitable forms creatable by appropriate input devices. It is further appreciated that alternative input devices to a stylus may also be utilized in accordance with the present invention, such as a user's finger or a stylus which is not pen shaped.

As previously indicated, it is important that the electronic device 101 receives accurate input data from input device 104 to ensure that the output from touch screen 102 is in line with what user 103 requires. Consequently, any drop out of the pressure input path is undesirable as this can lead to an inaccurate response.

FIG. 2

In the embodiment described with reference to FIG. 1, electronic device 101 comprises a sensing array 201 which provides a response to an applied force or applied pressure.

Sensing array 201 comprises a plurality of sensing elements such as 202, 203 and 204. In the embodiment, each sensing element comprises a pressure sensitive material which is responsive to an applied pressure. The pressure sensitive material may be of the type supplied by the applicant Peratech Holdco Limited under the trade mark QTC®, which includes material which exhibits a reduction in electrical resistance following the application of a force or pressure. In this way, the sensing array can be configured to provide both two-dimensional positional data and an extent property in response to an applied pressure.

In this illustrated example, sensing array 201 comprises fifteen columns 205 and five rows 206. In a further example embodiment, sensing array 201 comprises fifty columns and twenty-four rows. It is further appreciated that alternative arrangements fall within the scope of invention and that any other suitable number of rows and columns may be utilized. Furthermore, while the illustrated example describes a square array, it is appreciated that other alternative array forms may be utilized, for example, a hexagonal array or similar. However, in all embodiments, the sensing array comprises a plurality of sensing elements that are arranged and which are responsive to an application of force or pressure.

A column connector 207 receives driving voltages from a processor and a row connector 208 supplies scan voltages to the processor. Without the application of force or pressure, all of the sensing elements within sensing array 201 remain non-conductive. However, when sufficient pressure is applied to the sensing array in proximity to at least one of the sensing elements, that sensing element becomes conductive, thereby providing a response between an input driving line and an output scanned line. In this way, when user 103 moves stylus 104 across touch screen 102 and consequently sensing array 201, a number of the sensing elements may become conductive or active in line with the gesture made with stylus 104.

FIG. 3

Figure 3:
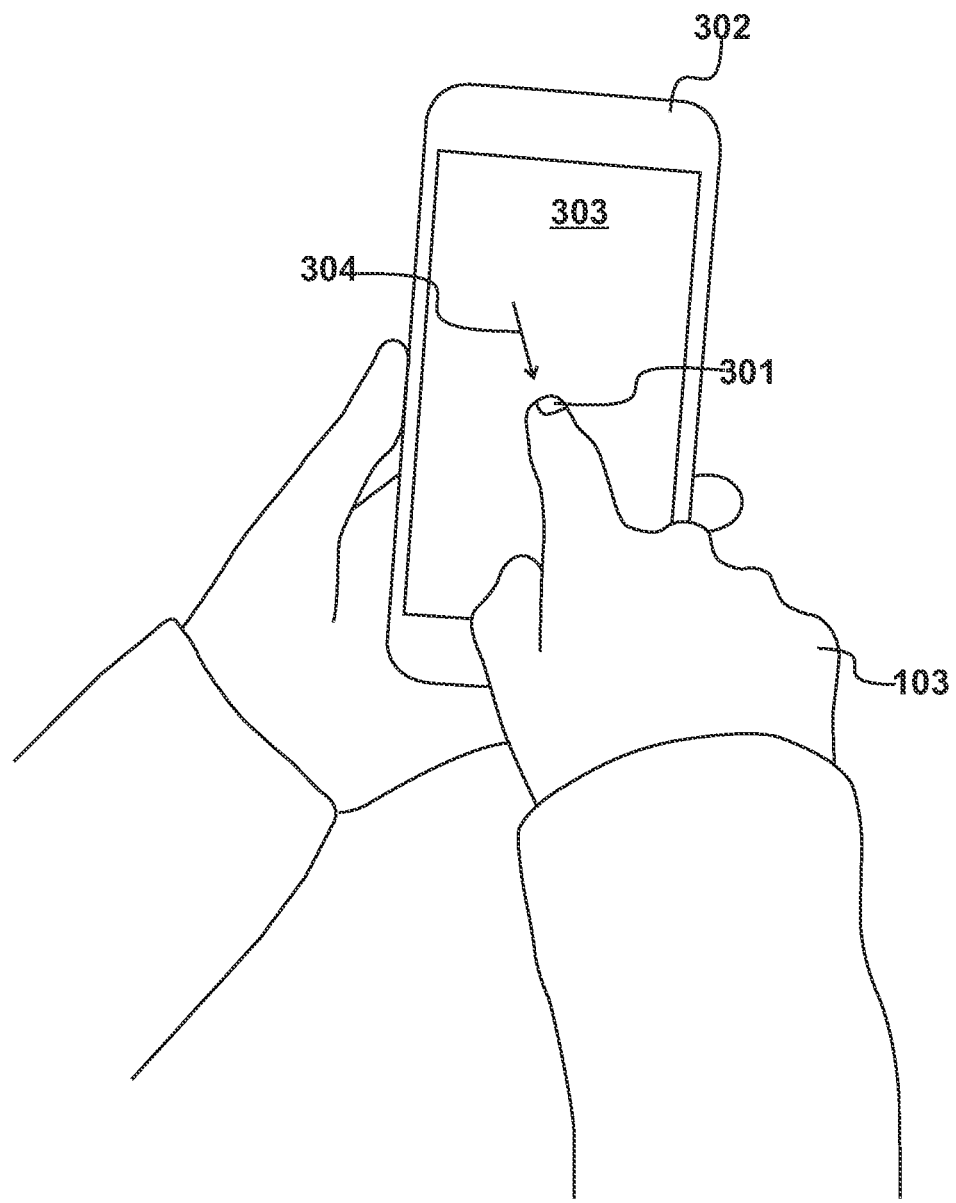
FIG. 3 shows a further electronic device comprising an apparatus for tracking a pressure input.

A further example embodiment is shown in FIG. 3 in which user 103 inputs an appropriate gesture with their finger 301 on electronic device 302. In this example embodiment, electronic device 302 comprises a mobile telephone which comprises touch screen 303 having a sensing array, such as sensing array 201.

In this example, user 103 has performed a gesture having a pressure input, indicated by arrow 304 across touch screen 303, thereby activating a plurality of sensing elements in the process, as will be described further with respect to FIG. 4.

FIG. 4

Figure 2:
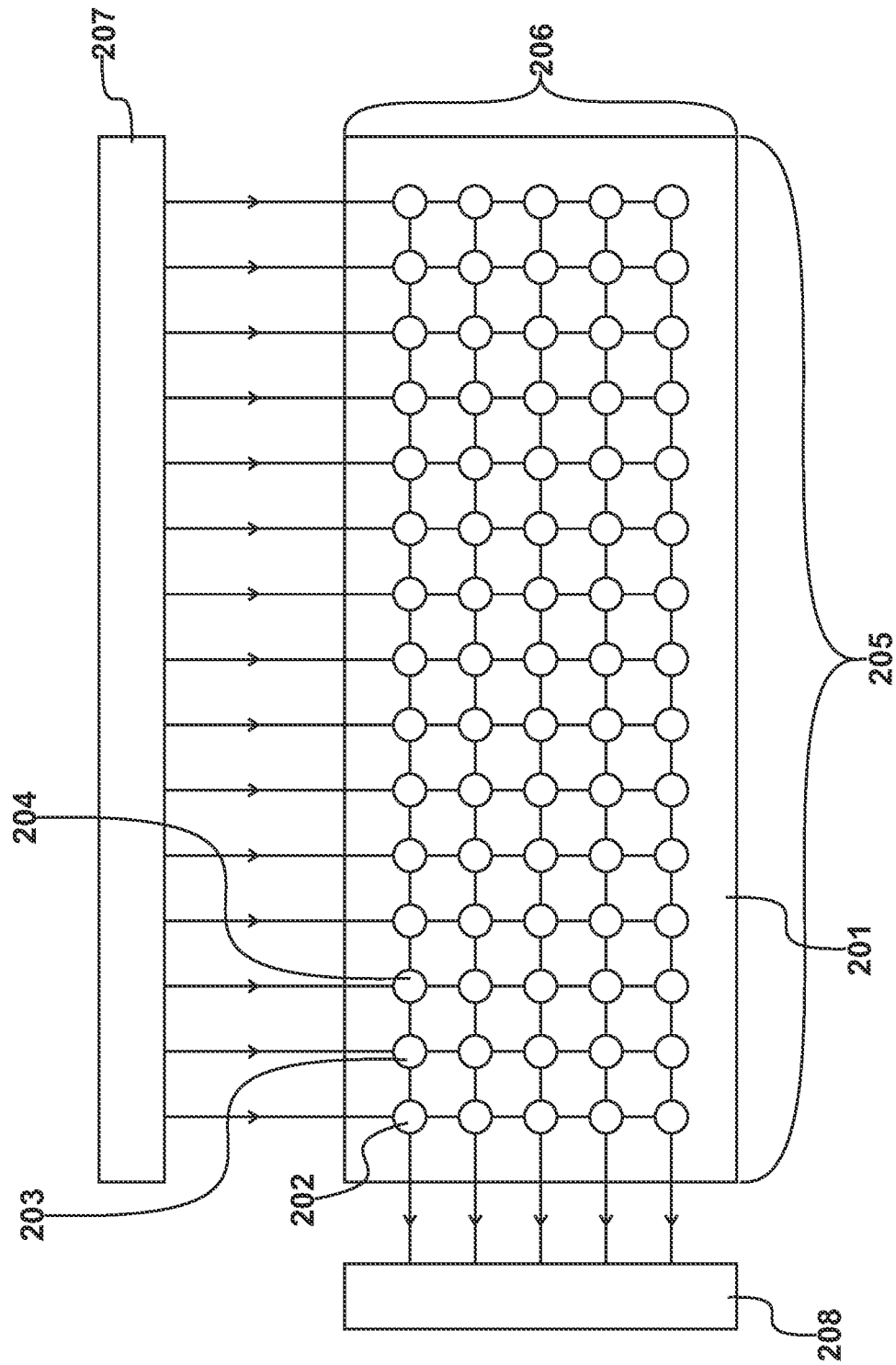
FIG. 2 shows a sensing array comprising a plurality of sensing elements.
Figure 4:
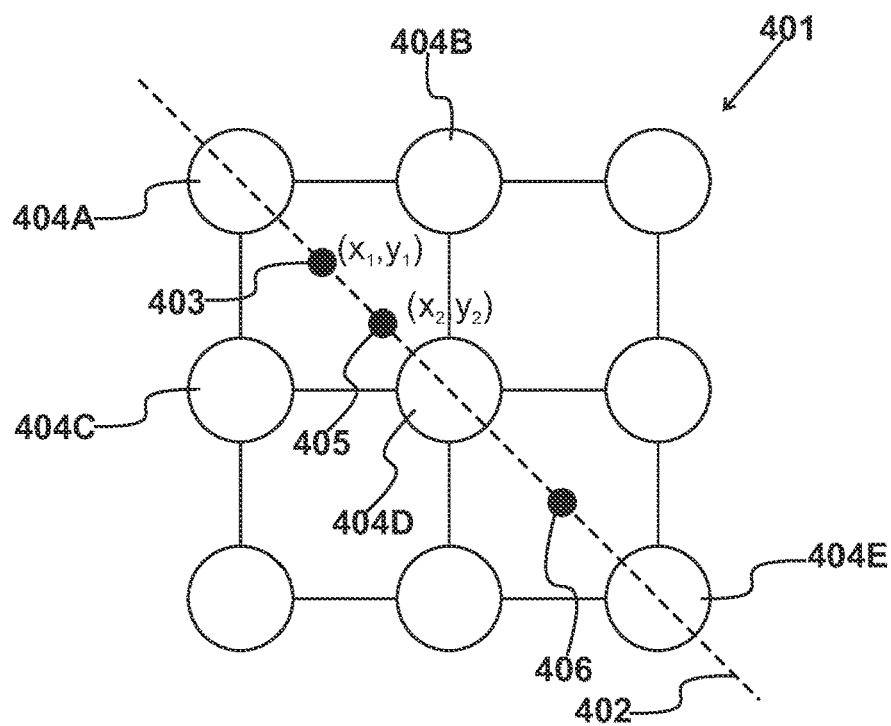
FIG. 4 shows a pressure input path in a sensing array.

A portion of a sensing array 401 in accordance with the present invention is shown in FIG. 4. In this embodiment, the sensing array portion 401 comprises a 3×3 array having nine sensing elements. It is anticipated that sensing array 401 forms part of a larger array, such as sensing array 201 previously described in FIG. 2, or a similar sensing array of a different size. A pressure input path 402 is shown as a dashed line to illustrate the path provided by a user either by means of an input device, stylus, finger or similar.

As the user moves the input device or similar along path 402, appropriate sensing elements will activate. In the embodiment, the system is configured to take a reading of pressure at given pre-specified time intervals, such as frames.

In the illustrated embodiment, at a first frame, a first location data point 403 is identified having coordinates of $x_1$, $y_1$. In response to a pressure applied at 403, sensing elements 404A, 404B and 404C are activated, thereby allowing for the location data to be calculated.

As the user moves the input device or similar along path 402, at a second frame, a second location data point 405 is identified, this time having coordinates of $x_2$, $y_2$. In response to the pressure applied at 405, sensing elements 404B, 404C and 4040 have been activated, which again allows for the location data points to be activated.

In the embodiment, at a third frame, the user moves the input device further along path 402 to point 406. In this case, however, none of the surrounding sensing elements have been activated. This may be due to a fault in the array or as is a particular problem when using a narrow stylus, the applied pressure may not be sufficient enough to provide a reading from the array. This would typically lead to drop out and the system would consider the gesture terminated after point 405.

Based on location data points 403 and 405, however, state vector 407 is calculated, with a state location comprising x indicating the current horizontal coordinate and y indicating the current vertical coordinate. A state velocity ($V_x$ and $V_y$) can be calculated from the change in x and y coordinates divided by the time between them, as per equations 408 and 409. In this particular example, the time, t, is one frame and thus, the velocity can be calculated solely from the difference in the position or location data. Thus, the state location and state velocity provide indications of the present state of the applied pressure for the state vector.

In the embodiment, if the third frame has not indicated a further location data point (i.e., point 406), and the signal has dropped out, a predicted path is determined based on state vector 407. Equation 410 illustrates how this may be calculated from the state vector with the predicted x coordinate ($x_{new}$) being the sum of the previous x coordinate ($x_{old}$) plus the predicted distance based on multiplication of the calculated velocity ($v_x$) and time period. In the embodiment, the velocity is considered constant and the position is calculated on that basis. Thus, in this way, previous location data points are extrapolated to predict a further location data point.

Following prediction of data point 406, it is envisaged that further activation of further sensing elements occurs, which, in an embodiment, may include activation of sensing element 404E. In this example, the later calculated location data point may be utilized to confirm or correct data point 406, and, in either case, form the newest data point along the pressure input path by replacing the earlier measured or predicted location data point.

In the embodiment, each location data point 403, 405 and 406 comprises two-dimensional positional data. However, in a further embodiment, it is appreciated that the location data points may further include a measurement of applied force or pressure calculated from the readings of the surrounding sensing elements. These may further be predicted by reviewing the variation in force over the time period and formulating a corresponding state vector accordingly.

In a still further embodiment, the state vector includes a further component of acceleration, which can be calculated from the change in the velocity components over the measured time period. Thus, in this way, variations in the velocity of the gesture can be utilized and predictions made on this basis.

In the embodiment, if no further sensing elements are activated following calculation of the predicted path, the predicted path is terminated following a predetermined time period as, in this situation, the gesture or pressure input has ended. This process will now be described further in respect of FIGS. 5 and 6.

FIG. 5

Figure 5:
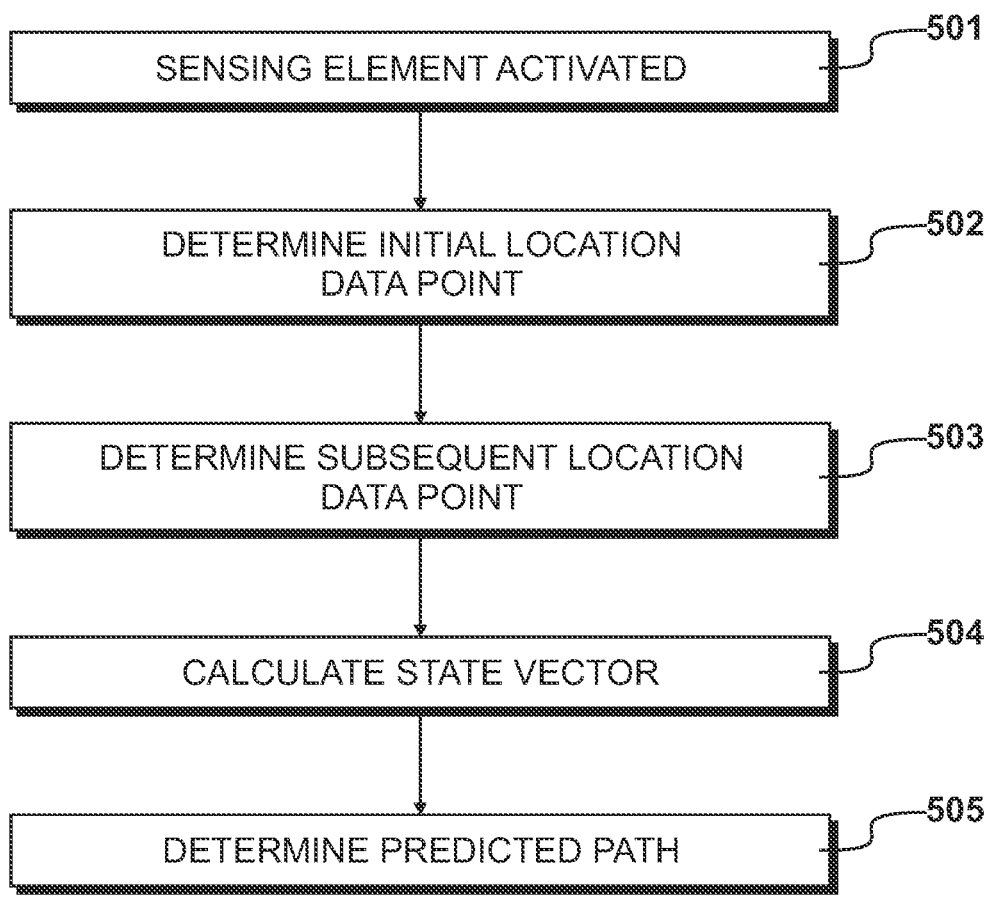
FIG. 5 shows a method of maintaining a pressure input path in a sensing array.

A method of maintaining a pressure input path in a sensing array is shown in schematic form in FIG. 5. At step 501, at least one sensing element is activated to provide a reading of location and/or pressure from the sensing element.

An initial location data point is then determined from the data from the sensing element at step 502 as previously described. Following this, at step 503, a subsequent location data point is determined following activation of a further sensing element. A state vector is calculated at step 504 based on the location data points determined at steps 502 and 503.

As described with respect of the example of FIG. 4, a predicted path is calculated at step 505 such that a continuous pressure input path can be estimated or utilized to prevent drop out in the input gesture or swipe of a user.

In the embodiment, to further improve the output and accuracy in accordance with the method, the sensing array can be scanned absent of any activated sensing elements to determine a background reading. This background reading can then be removed from the results when determining the location data points by setting it to zero. Furthermore, a further step of smoothing can be applied to the data points in a predicted path to ensure the output is in line with a user's expectation.

FIG. 6

Figure 6:
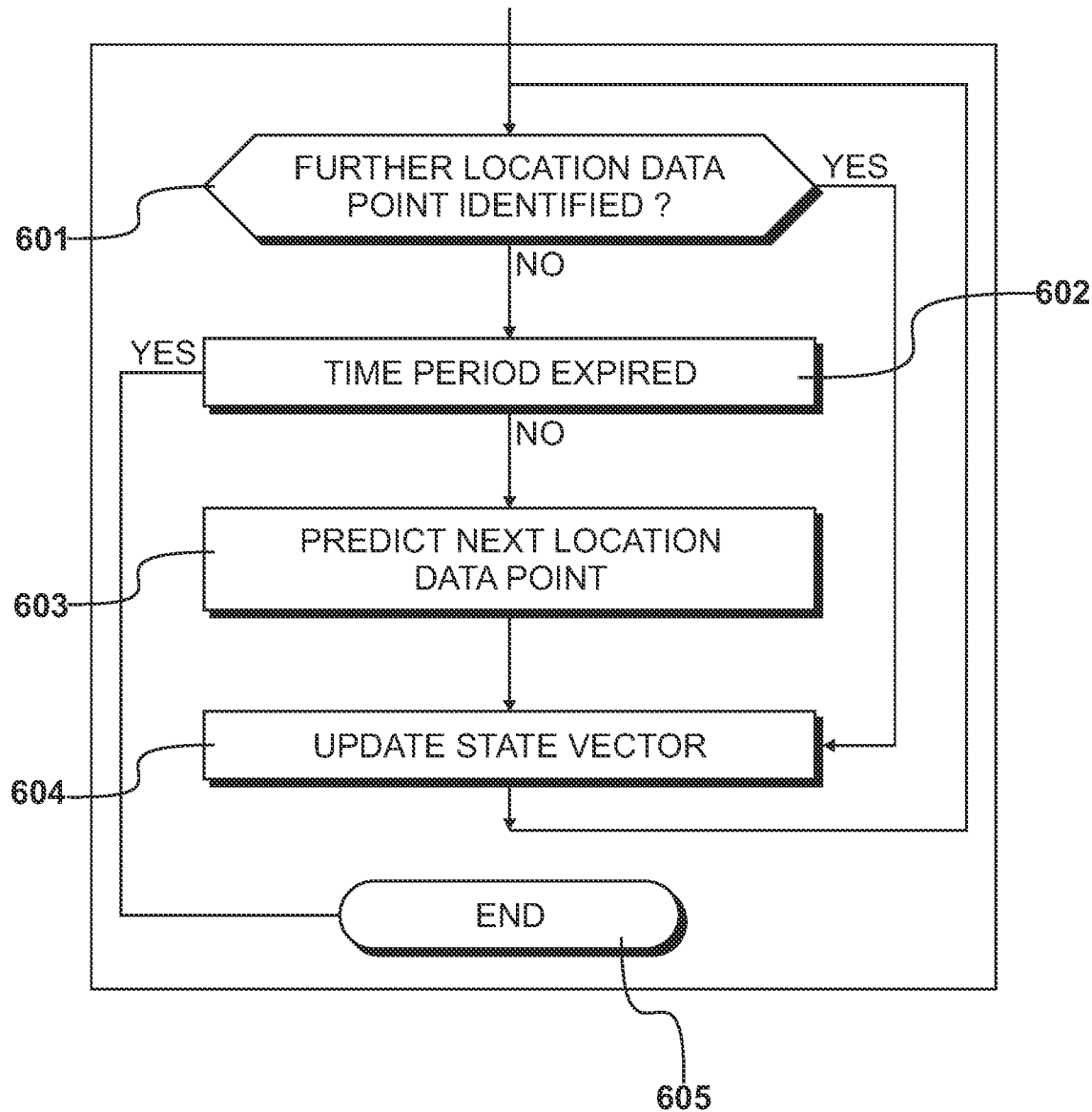
FIG. 6 shows steps in the process of determining a predicted path and updating a state vector.

Further steps in the method of maintaining a pressure input path are shown in FIG. 6 which provides additional steps in the process of determining a predicted path and updating the state vector.

At step 601 a question is asked as to whether a further location data point has been identified. This would include readings from the sensing array calculated in response to a force or pressure input from an input device of a user and subsequent activation of any of the sensing elements. If the question is answered in the affirmative, the state vector is updated with the new measured information, at step 604. The question is then repeated to check for further inputs for a predetermined time period.

When the question at step 601 is answered in the negative, a question is asked at step 602 as to whether the predetermined time period has expired. This time period is set depending on the application and requirements as to how long the system should wait without new pressure measurements before treating the pressure input path as terminated. If the question is answered in the affirmative, then the process is terminated and the pressure input path is considered ended. If the question is answered in the negative, as in the time period has not yet expired, a further location data point is predicted as per the method and calculation of FIG. 4, and this is used to update the state vector with predicted values. The process is then repeated until the time period with no activation of sensing elements has expired.

It is acknowledged that the process of updating the state vector not only provides an update of location data points where necessary, but also a recalculation of velocity based on the change in location, a recalculation of acceleration based on the change in velocity or an update of an extent property such as force or pressure determined or predicted from the output of the sensing elements.

FIG. 7

Figure 7:
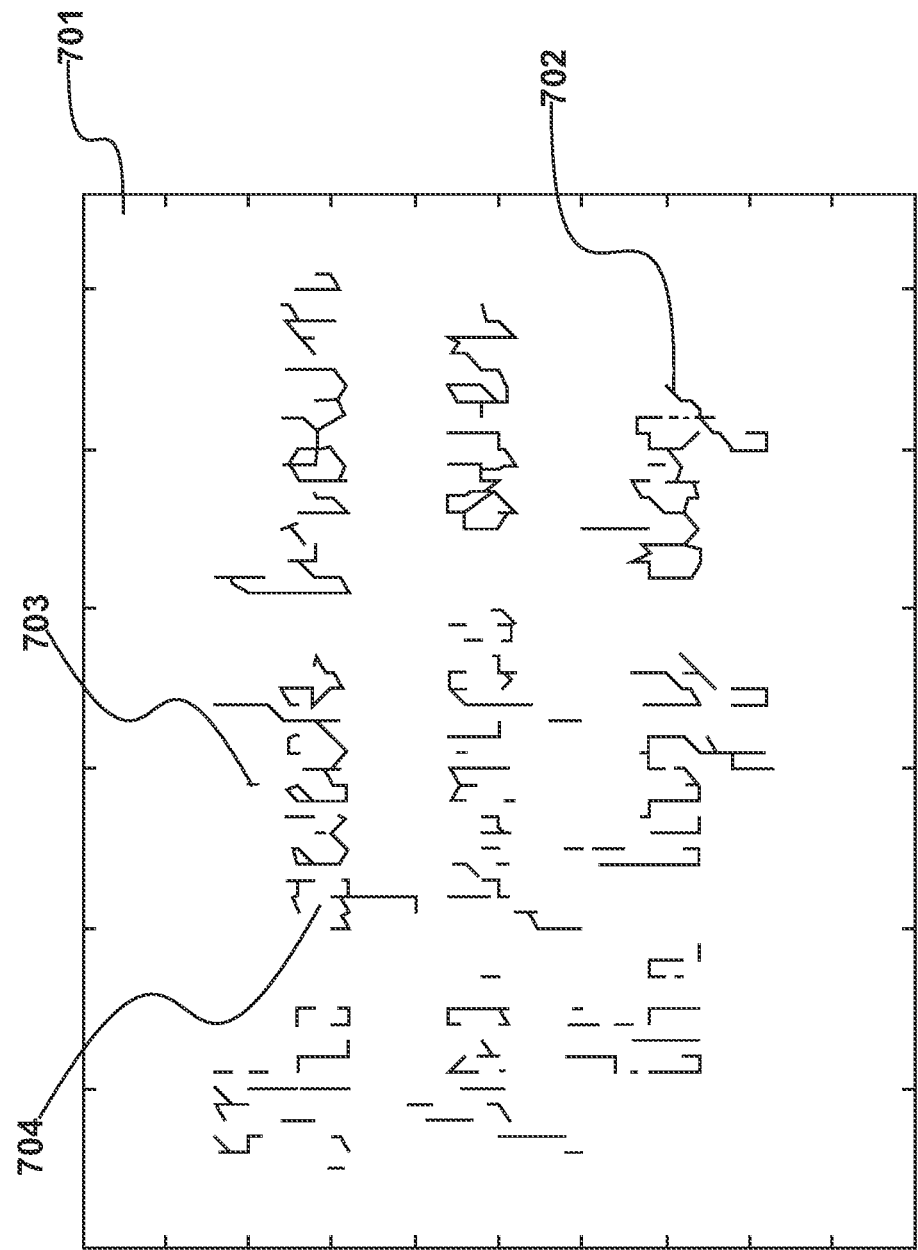
FIG. 7 shows an output on a touch screen of an electronic device exhibiting drop out readings.
Figure 8:
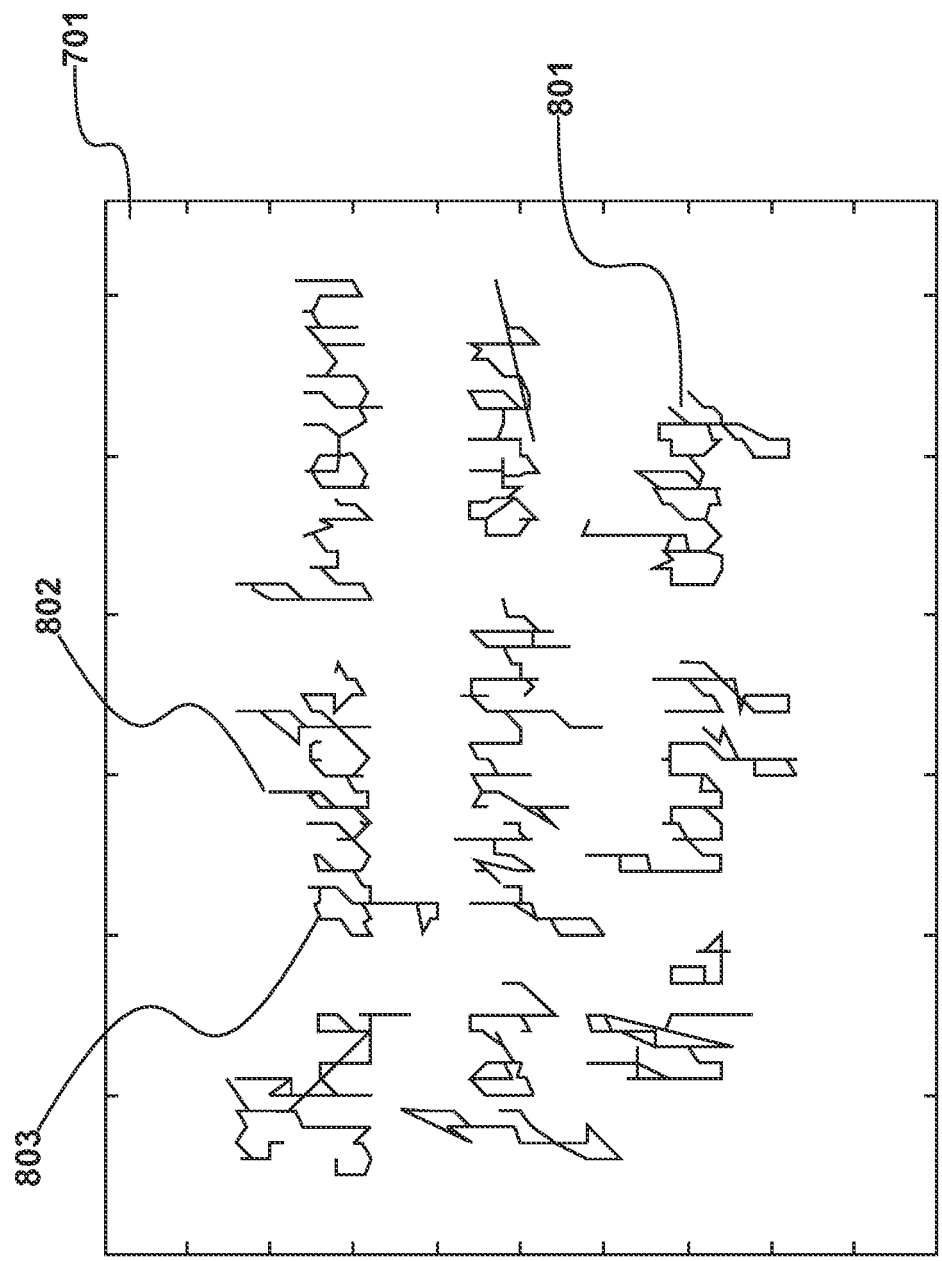
FIG. 8 shows an output on a touch screen of an electronic device with reduced drop out in accordance with the present invention.

An example output on a touch screen of an electronic device in response to a gesture applied to a such a touch screen is shown in FIGS. 7 and 8.

In FIG. 7, touch screen 701 shows an output of handwriting script 702 constructed in response to an input from an input device such as stylus 104 described previously.

Analysis of the word "quick" 703 reveals a number of spaces in the lettering, such as spacing 704, that would not typically be expected when writing the letter "q" for example. Thus, this illustrates the issue experienced with drop out on such touch screens, which can lead to the written word in this case being poorly formed and, in some cases, unreadable.

FIG. 8

In contrast to the example shown in FIG. 7, FIG. 8 shows a response consistent with the claimed invention. In this case, the output on touch screen 701 shows a reduced drop out in response to the gestures providing the wording.

In comparison, handwriting script 801 illustrates a more readable response, and, in particular, analysis of the word "quick"802 reveals a formed letter "q" which is fully joined and more in line with how the letter would be conventionally written. In this way, the claimed invention provides a more readable alternative to prior known systems which suffer from drop out.

FIG. 9

Figure 9:
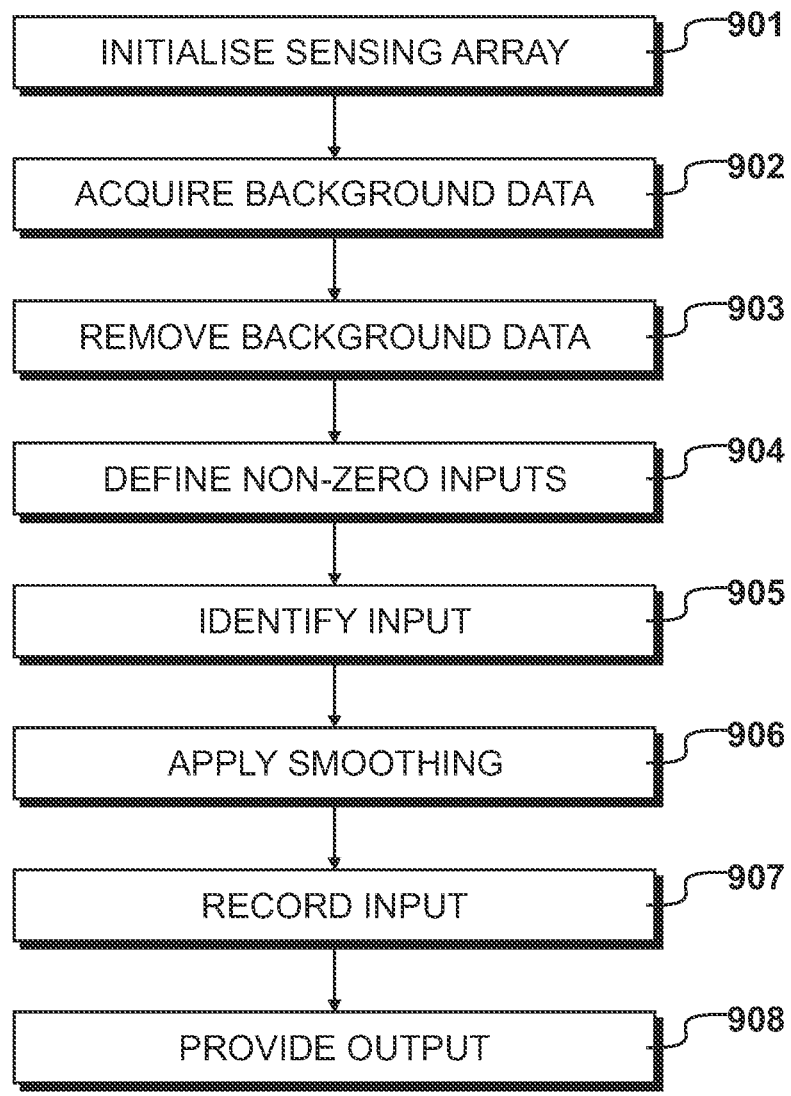
FIG. 9 shows a process for providing a smoothed predictive approach to tracking of inputs for use in multi-input force sensing.

The method of maintaining a pressure input path previously described can be incorporated as part of a process which provides a smoothed predictive approach to tracking of inputs which can be utilized in multi-input force sensing. FIG. 9 shows a process in which the method of the claimed invention can be incorporated into a method of tracking and visualizing an input in a sensing array.

At step 901, a sensing array, such as sensing array 201, is initialized. Any algorithm required to ensure a smooth predictive output onto an electronic device or touch screen is loaded so that the touch screen is ready to respond to any contact made by a user. Properties of the sensing array may be provided to a processor to ensure that any outputs are compatible with the sensing array itself.

In an embodiment, a palm rejection model may also be loaded to ensure that readings accidently made by a user's palm can be effectively rejected and not mistaken for genuine inputs.

At step 902, data is gathered from the sensing array to ascertain any background levels which need to be filtered from the input. The data gathering process extracts raw data from the sensor including stray activations, sensor noise and any desired signals. Any stray activations and/or sensor noise, including palm readings, must be filtered out prior to the determination of the location of a genuine touch input so as to avoid a reading which is prone to significant noise.

During this step, in an embodiment, a low-pass convolutional filter is applied to the gathered data to smooth out any noisy background activations. For a first acquisition, or when there is currently no input from a user's finger or stylus, a background reading can be stored, updating any previous background reading data previously stored into the system. Any background reading can then be removed from the current data, as per step 903, along with any data below a threshold for undesirable data inputs, such as a palm.

Co-ordinates for any non-zero inputs are defined at step 904. This provides an isolated signal, free from the background data previously removed at step 903. Any data identified here is considered a desirable input forming part of the input path intended by a user. At step 905, the type of input is identified. This can be a new pressure input, a current pressure input (such as a continuation of a pressure input path), a predicted input (based on previous input data) or no input. This step of identification is explained further with respect to FIG. 10.

Once the pressure input has been identified, smoothing can be applied at step 906. If the pressure input path is identified as a new pressure input or an existing pressure input, all relevant historic positions are identified and a smoothing function is applied to the positions to achieve a desirable path. A Gaussian average is applied across the historic positions to provide a smoothed data point. A weighting can be provided to the current data point to provide an output which is robust to the noise in the system.

At step 907, the pressure input path is updated on the basis of step 906, and recorded to the system. In an example where the pressure input path is complete, the path is stored and reset to take the process back to the beginning.

Step 908 provides an output visualization for a user. Prior to the output, in order to provide a more suitable visual to a user, Bezier smoothing can be applied to increase the apparent resolution such that the handwriting script of FIG. 8 for example gives a visual appearance that gives the appearance of natural handwriting to a user. The Bézier smoothing can be particularly advantageous as it can include a continuous approach in which historic data is reviewed and updated as the pressure input path is still being completed. This enables fine adjustments to be made which can be particularly appealing in the case where the pressure input path is output in the form of handwriting script.

In an embodiment, the output visualization may also include a determination of the thickness of the output line which is calculated relative to the average of the input pressure applied by a user. In this way, a harder input press from a user may result in a thicker output line and a lighter input press from a user may result in a thinner output line.

Once an output has been provided, the process may be repeated by returning to step 902 to provide continuous outputs for a user.

FIG. 10

Figure 10:
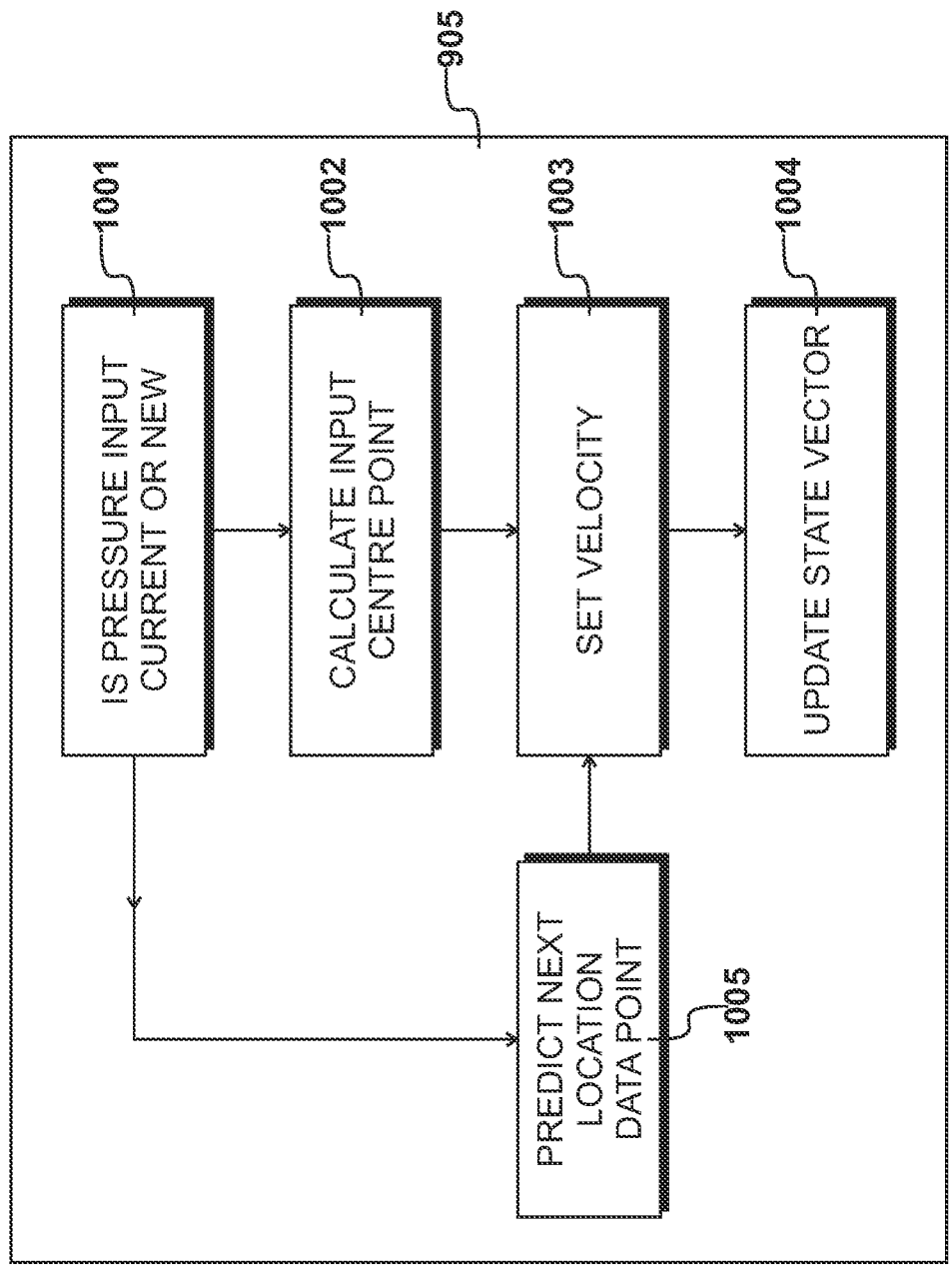
FIG. 10 shows further steps in the process of FIG. 9.

The step of identification of the pressure input is described further in respect of FIG. 10. At step 1001, a question is asked as to whether the pressure input is a current pressure input or a new pressure input. If the pressure input is one of these cases, then at step 1002 a center point of the pressure input is calculated.

In the event of a pressure input a user may activate a number of sensing elements in the sensing array. When an input is made in this way, some of the activated sensing elements will receive a higher pressure input than others due to their proximity to the point of pressure. This step therefore calculates the position, or center point, at which the pressure is considered to act. This can be calculated by finding the average position of activation which is weighted by the pressure input's activation level. This center point calculation can therefore be used to determine if the press is a new input or a continuation of an already identified input as this can be interpolated from the center point activation.

At step 1003, if the pressure input is identified as being new, the velocity is set to zero. This is because there is no historic position data to determine the velocity of the input path motion. In the event that the pressure input is identified as being current, the velocity can be calculated as described previously based on the current position and a previous position. The state vector can then be updated as previously described at step 1004.

If the pressure input is not identified as a current pressure input or a new pressure input, then the question at step 1001 will be answered in the negative and the next location data point will be predicted as previously described at step 1005. A count is incremented in which the count stores the number of successive datasets which have not identified an activation. If the time period has expired, then the process can be ended with the path being stored and reset. Where predicted, the velocity can be set at step 1003 based on previously stored values as indicated.

The invention claimed is:

1. A method of maintaining a pressure input path in a sensing array, said sensing array comprising a plurality of sensing elements, said method comprising the steps of:
    activating a first sensing element to determine a first location data point;
    activating a second sensing element to determine a second location data point;
    calculating a state location and a state velocity based on said first location data point and said second location data point to create a state vector;
    determining a predicted path of at least one further location data point from said state vector;
    updating said state vector by replacing an earlier location data point with a later location data point derived from activation of a further sensing element;
    utilizing said predicted path to provide a continuous pressure input path to prevent drop out of an input gesture; and
    terminating said predicted path following a predetermined time period in which no further sensing elements have been activated.

2. The method of claim 1, wherein each said location data point comprises two-dimensional positional data.

3. The method of claim 1, wherein each said location data point comprises a measurement of applied pressure.

4. The method of claim 1, further comprising the step of:
    updating said state vector by recalculating said state velocity in respect of said second location data point and a third location data point.

5. The method of claim 1, wherein said step of determining said predicted path comprises extrapolating said location data points to predict a further location data point.

6. The method of claim 1, further comprising the step of:
    scanning said sensing array absent of any activated sensing elements to determine a background reading; and
    removing said background reading when determining said location data points.

7. The method of claim 1, further comprising the step of:
    performing a smoothing process to data points in said predicted path.

8. An apparatus for maintaining a pressure input, comprising:
    a sensing array comprising a plurality of sensing elements; and a processor configured to:
: determine a first location data point in response to activation of a first sensing element;
: determine a second location data point in response to activation of a second sensing element;
: calculate a state location and state velocity based on said first location data point and said second location data point to create a state vector;
: determine a predicted path of at least one further location data point based on said state vector;
: update said state vector by replacing an earlier location data point with a later location data point derived from activation of a further sensing element;
: utilize said predicted path to provide a continuous pressure input path to prevent drop out of an input gesture; and
: terminate said predicted path following a predetermined time period in which no further sensing elements have been activated.

9. The apparatus of claim 8, wherein said sensing elements comprise a pressure sensitive material responsive to an applied pressure.

10. The apparatus of claim 8, wherein said sensing array is configured to provide two-dimensional positional data and an extent property in response to an applied pressure.

11. A touch screen comprising the apparatus of claim 8.

12. An electronic device comprising the touch screen of claim 11.

13. A method of maintaining a pressure input path in a sensing array, said sensing array comprising a plurality of sensing elements, said method comprising the steps of:
: scanning said sensing array absent of any activated sensing elements to determine a background reading; and
: activating a first sensing element and removing said background reading to determine a first location data point;
: activating a second sensing element and removing said background reading to determine a second location data point;
: calculating a state location and a state velocity based on said first location data point and said second location data point to create a state vector;
: determining a predicted path of at least one further location data point from said state vector;
: utilizing said predicted path to provide a continuous pressure input path to prevent drop out of an input gesture; and
: terminating said predicted path following a predetermined time period in which no further sensing elements have been activated.

14. The method of claim 13, wherein each said location data point comprises two-dimensional positional data.

15. The method of claim 13, wherein each said location data point comprises a measurement of applied pressure.

16. The method of claim 13, further comprising the step of:
: updating said state vector by recalculating said state velocity in respect of said second location data point and a third location data point.

17. The method of claim 13, wherein said step of determining said predicted path comprises extrapolating said location data points to predict a further location data point.

18. The method of claim 13, further comprising the step of:
: performing a smoothing process to data points in said predicted path.

\* \* \* \* \*